United States Patent Office 3,144,462
Patented Aug. 11, 1964

3,144,462
SEPARATION OF ISOMERIC DINITRO-
CARBAZOLES
Henry M. Grotta, Delaware, Ohio, assignor, by mesne assignments, to Martin-Marietta Corporation, New York, N.Y., a corporation of Maryland
No Drawing. Filed Aug. 14, 1963, Ser. No. 301,956
5 Claims. (Cl. 260—318)

The present invention relates to a method for separating, isolating and recovering 1,6-dinitrocarbazole and 3,6-dinitrocarbazole from a mixture of dinitrocarbazoles.

The present invention is particularly characterized in that it provides for the first time a method for preparing 1,6-dinitrocarbazole and 3,6-dinitrocarbazole in substantially pure form.

Generally speaking, the method of the present invention comprises the steps of dinitrating carbazole by any conventional or selected method to form a crude mixture comprising 1,6-dinitrocarbazole and 3,6-dinitrocarbazole and having a liquid and a solids portion; separating said liquid portion from said solids portion; adding an alcoholic solution of alkali to said solids portion to dissolve the 3,6-dinitrocarbazole as its salt while leaving the corresponding salt of 1,6-dinitrocarbazole as a solid; separating said salts; acidifying said separated salts to reform 1,6-dinitrocarbazole and 3,6-dinitrocarbazole; and recovering the separated 1,6-dinitrocarbazole and 3,6-dinitrocarbazole isomers.

The above dinitrocarbazoles are valuable intermediates which may be utilized in the preparation of dyestuffs, for example either the 1,6- or 3,6-dinitrocarbazole may be reduced, diazotized and coupled with a wide variety of coupling components, such as the sodium salt of 2-naphthol-6-sulfonic acid, to form valuable diazodyestuffs. Also, either the 1,6- or 3,6-dinitrocarbazole may be reduced by hydrogenation to form the corresponding diaminocarbazoles in pure form, which may be reacted with phosgene to form the corresponding diisocyanates, from which urethane polymers may be formed.

Although carbazole has been dinitrated previously, it has never before been recognized that the result of this dinitration is a mixture of 1,6-dinitrocarbazole and 3,6-dinitrocarbazole, and that 1,6-dinitrocarbazole is present in substantial quantity. Earlier workers recrystallized the dinitrocarbazoles mixture and erroneously concluded that they had recovered pure 3,6-dinitrocarbazole having a melting point of 365°–367° C. As will be recognized from the present invention, substantially pure 3,6-dinitrocarbazole melts at 386°–387° C., which is significantly higher than the above 365°–367° C., and these earlier workers probably recovered a mixture comprising 1,6-dinitrocarbazole and 3,6-dinitrocarbazole.

1,6-dinitrocarbazole has not previously been isolated or prepared as a substantially pure compound, although its possible presence in aged smokeless gunpowder has been suggested without substantiation.

According to the method of the present invention, 1,6-dinitrocarbazole and 3,6-dinitrocarbazole of high purity may be separated from the crude mixture of dinitrocarbazoles. Moreover, high yields may be obtained by the method of the present invention.

According to the method of the present invention, carbazole may be dinitrated by any convenient or known method, such as adding nitric acid to carbazole in acetic acid, or by adding sodium nitrite to carbazole in acetic acid followed by the addition of nitric acid; this latter dinitration procedure is preferred because it gives a higher melting, more easily purifiable crude reaction mixture. The reaction mixture is preferably cooled, diluted with water, and then filtered to yield a greenish-yellow crude solid product comprising a mixtue of 1,6-dinitrocarbazole and 3,6-dinitrocarbazole.

The filtrate is discarded and the crude solid product is preferably dried. When the crude dinitrocarbazoles are prepared by use of nitric acid the mixture has a melting point of about 310°–313° C., which is raised to 310–340° C. on recrystallization from nitrobenzene, and when sodium nitrite and nitric acid are utilized in preparing the crude dinitrocarbazoles, the mixture begins to soften at 312° C. and melts at 354° C.

The crude solid mixture of dinitrocarbazoles may optionally be recrystallized from nitrobenzene, as an aid in removing impurities, although this step is not essential.

An alcoholic solution of alkali is next added to the crude mixture of dinitrocarbazoles with stirring. Strong alkali, such as potassium hydroxide, dissolved in absolute or 95% ethanol, is suggested. Sixty grams of dissolved potassium hydroxide per liter of absolute ethanol is suitable, and the use of one liter of this alcoholic solution of alkali for each 15–30 grams of crude dinitrocarbazoles mixture is suggested, but by no means critical.

The alkali converts each of the isomeric dinitrocarbazoles to its anionic salt form, as indicated by sharp color change, and the anionic salt of 3,6-dinitrocarbazole is dissolved in the alcohol, while the anionic salt of 1,6-dinitrocarbazole is essentially undissolved and remains as a solid.

The solid anionic salt of 1,6-dinitrocarbazole and the alcoholic, alkaline solution of the anionic salt of 3,6-dinitrocarbazole are then separated from each other by any suitable means, such as filtration.

The 3,6-dinitrocarbazole may be recovered from the alcoholic, alkaline solution of the anionic salt of 3,6-dinitrocarbazole and then purified. The solution is acidified to convert the anionic salt to 3,6-dinitrocarbazole. An acid which is more strongly acid than the 3,6-dinitrocarbazole should be used, and for convenience one which forms a water soluble salt of the metallic cation from the alkali is suggested; such acids as hydrochloric, sulfuric or phosphoric are suitable and economical. The acidification causes precipitation of 3,6-dinitrocarbazole in the form of yellow solids. The precipitated 3,6-dinitrocarbazole is collected, as by filtration, and washed with warm water to remove any water soluble salt which has been coprecipitated therewith, such as potassium chloride which results when potassium hydroxide and hydrochloric acid are used in the method. Wet filter cake produced by this method may be reduced, diazotized and coupled to form dyestuffs; and if 3,6-dinitrocarbazole of higher purity is desired the wet filter cake may be dried and recrystallized from an organic solvent, such as nitrobenzene, to yield yellow needles of 3,6-dinitrocarbazole having a melting point of 386°–387° C. Nearly all of the 3,6 dinitrocarbazole present in the crude dinitrocarbazoles mixture, which is 50–60% of the weight of the crude mixture, is recovered by the present method.

The solid anionic salt of 1,6-dinitrocarbazole is treated with a liquid more acid than 1,6-dinitrocarbazole, such as dilute hydrochloric acid, to convert the anionic salt to 1,6-dinitrocarbazole. The liquid is decanted and discarded and the residue of 1,6-dinitrocarbazole solids washed with warm water to remove any water soluble salt therein. The 1,6-dinitrocarbazole may be collected as wet filter cake and utilized as such a dye intermediate; and if 1,6-dinitrocarbazole of higher purity is desired the wet filter cake may be dried and recrystallized from an organic solvent, such as nitrobenzene, to yield glistening golden leaflets of 1,6-dinitrocarbazole having a melting point of 344°–346° C. Nearly all of the 1,6-dinitrocarbazole present in the crude dinitrocarbazoles mixture, which is 30–35% of the weight of the crude dinitrocarbazoles mixture, may be recovered by the method of the present invention.

Thus, according to the method of the present invention, 1,6-dinitrocarbazole and 3,6-dinitrocarbazole, which never appear to have been isolated in substantially pure form before, may now be produced in substantially pure form.

The following specific examples are set forth as non-limiting examples which are suitable for carrying out the method of the present invention.

*Example I*

A slurry is prepared by adding 83.6 gm. (0.5 mole) of carbazole to 640 gm. of glacial acetic acid. The slurry is stirred and maintained at 30°–40° C. for 1.5 hours, during which time 35.3 gm. (0.5 mole) of sodium nitrite is added. The slurry is heated and stirred for an additional 30 minutes, at the end of which time most of the solid has dissolved as 9-nitrosocarbazole; an additional 5 gm. of sodium nitrite is added to assist in forming the solution. Not quite all of the solid goes into solution.

A solution containing 74 gm. of 90% nitric acid (1.05 moles) and 74 gm. of glacial acetic acid is added to the above solution of 9-nitrosocarbazole and solid during a period of 1.3 hours, with stirring and cooling to 30°–40° C. The resultant slurry is stirred at 30°–40° C. for 3.5 additional hours, then held at 55° C. for 1.5 hours, then held at 65° C. for 1.5 hours, then held at 95° C. for 2 hours, cooled to 65° C., filtered, the filtrate discarded, the resulting solid washed with 350 ml. of cold glacial acetic acid, washed with water, and then dried. Eighty-six grams of greenish-yellow crude dinitrocarbazoles, which is believed to be primarily a mixture of 1,6-dinitrocarbazole and 3,6-dinitrocarbazole, is recovered.

45.5 gm. of the above greenish-yellow crude dinitrocarbazoles is divided into two 22.75 gm. portions, and to each portion is added, with stirring, 1.5 liters of a 60 gm. per liter solution of potassium hydroxide in absolute ethyl alcohol, the alcoholic alkali being at 50° C. An insoluble red residue, which is the potassium salt of 1,6-dinitrocarbazole, and a red liquid, which is a solution of the potassium salt of 3,6-dinitrocarbazole, results in each portion.

Each of the resulting portions are filtered, and the resuling insoluble red residues collected and the resulting red filtrates saved.

The insoluble red residues are combined, disgested on a steam bath with 200 ml. of a 5% aqueous solution of hydrochloric acid, whereupon the color changed to yellow. The resulting product is filtered, the yellow solid recovered, washed with warm water to remove water soluble inorganic impurities, such as coprecipitated potassium chloride, dried, and 14.4 gm. of 1,6-dinitrocarbazole results, which is 31.6% of the weight of the crude dinitrocarbazoles. The 1,6-dinitrocarbazole is further purified by dissolving it in hot nitrobenzene, filtering while hot to remove the impurities which are insoluble in hot nitrobenzene, cooling the filtrate to recrystallize the 1,6-dinitrocarbazole, collecting the crystals by filtration, and warming under vacuum to dry the product and drive off the remaining nitrobenzene. The resulting product is 1,6-dinitrocarbazole in the form of glistening golden leaflets, having a corrected melting point of 344°–346° C.

Each of the above red solutions of the potassium salt of 3,6-dinitrocarbazole is acidified by adding thereto 150 ml. of concentrated hydrochloric acid; yellow precipitates are formed, comprising essentially 3,6-dinitrocarbazole and coprecipitated potassium chloride. The yellow precipitates are combined, washed thoroughly with warm water to remove water soluble salts, such as potassium chloride, collected by filtration and dried. 26.5 gm. of 3,6-dinitrocarbazole is thus recovered, which is 58.2% of the weight of the crude dinitrocarbazoles. The 3,6-dinitrocarbazole is further purified by dissolving it in hot nitrobenzene, filtering while hot to remove the impurities which are insoluble in hot nitrobenzene, cooling the filtrate to recrystallize the 3,6-dinitrocarbazole, collecting the crystals by filtration, and warming under vacuum to dry the product and drive off the remaining nitrobenzene. The resulting product is 3,6-dinitrocarbazole in the form of fine yellow needles, having a corrected melting point of 386°–387° C.

An additional 1.7 gms. of yellow material was recovered by extensive dilution of the acidified alcoholic filtrates with water. This material was principally 3,6-dinitrocarbazole.

*Example II*

This example is the same as Example I above, except that the crude dinitrocarbazoles was prepared by the following alternate synthesis, except that the crude dinitrocarbazoles was recrystallized from nitrobenzene, and except that a 42 gm. sample of the crude dinitrocarbazoles was substituted for the 45.5 gm. sample used in Example I.

The alternate synthesis for preparing the crude dinitrocarbazoles follows. To a stirred slurry of 167 gm. (1 mole) of carbazole in one liter of glacial acetic acid heated 65° C. is added 270 gm. (3 moles) of 70% nitric acid diluted with an equal volume of glacial acetic acid, during a period of 1.7 hours, with cooling to maintain the batch at approximately 75° C. The batch is heated for three additional hours at 73°–75° C., cooled to 25° C., diluted to a volume of four liters with water at room temperature, and filtered. The filtrate is discarded and the greenish-yellow crude solid dinitrocarbazoles product is collected and dried to yield 252.5 gm. of crude dinitrocarbazoles, which darkens at and has a melting point of 310°–313° C. The crude dinitrocarbazoles is recrystallized from nitrobenzene and the melting range thus raised to 310°–340° C.

The procedure of this example yields 54% of 3,6-dinitrocarbazole and 32% of 1,6-dinitrocarbazole, based on the weight of the crude dinitrocarbazoles starting material.

The following relates to establishing the structures of the 1,6-dinitrocarbazole and the 3,6-dinitrocarbazole thus prepared.

The structure of the 1,6-dinitrocarbazole was established as follows.

1,6-dinitrocarbazole is postulated as $C_{12}H_7N_3O_4$, thus having a theoretical nitrogen content of 16.34. Analysis of the 1,6-dinitrocarbazole produced by the method of Example I showed 16.3% nitrogen.

An infrared spectrum was obtained for the 1,6-dinitrocarbazole produced by the method of Example I, and showed a band at 2.8–2.9 mu, indicating the imino nitrogen group, strong bands at 6.5 mu and near 7.5 mu, indicating $NO_2$ groups, and the absorption bands generally found for substituted carbazoles.

Also, 1,6-dinitrocarbazole prepared by the method of Example I was converted to 1,6-dichlorocarbazole, and 1,6-dichlorocarbazole was also prepared by a new and alternate synthesis, and these two 1,6-dichlorocarbazoles were compared and found alike as follows.

A sample of the 1,6-dinitrocarbazole prepared by the method of Example I was converted to 1,6-dichlorocarbazole by reducing it with hydrogen and Raney nickel catalyst to the corresponding diamine, which diamine was diazotized and treated with cuprous chloride in hydrochloric acid to produce 1,6-dichlorocarbazole.

1,6-dichlorocarbazole was also prepared by a novel and different synthesis comprising condensing 2,5-dichloronitrobenzene with 2-chloroaniline to form 2′,4-dichloro-2-nitrodiphenylamine, reduction of the 2′,4-dichloro-2-nitrodiphenylamine by stannous chloride in hydrochloric acid and acetic acid to form 2-amino-2′,4-dichlorodiphenylamine, diazotization of the 2-amino-2′,4-dichlorodiphenylamine to produce 5-chloro-1-(2-chlorophenyl) benzotriazole, and thermal decomposition at 355° C. of the 5-chloro-1-(2-chlorophenyl) benzotriazole to form 1,6-dichlorocarbazole. An infrared spectrum was obtained for the 1,6-dichlorocarbazole thus prepared, and the imino hydrogen group appeared in this spectrum at 2.84 mu, which is typical for such a compound, and the remainder of the spectrum was typical of a substituted carbazole.

The samples of 1,6-dichlorocarbazole prepared by the two separate syntheses both had corrected melting points of 122.5–124° C., and addition of one sample of 1,6-dichlorocarbazole to the other failed to alter the melting point.

Theoretically, 1,6-dichlorocarbazole is $C_{12}H_7Cl_2N$, which is 61.02% C, 2.96% H, and 5.93% N. Upon analysis, the 1,6-dichlorocarbazole prepared from 5-chloro-1-(2-chlorophenyl) benzotriazole was found to have 60.8% C, 2.9% H, and 5.8% N.

The structure of the 3,6-dinitrocarbazole was established as follows.

3,6-dinitrocarbazole is postulated as $C_{12}H_7N_3O_4$, thus having a theoretical nitrogen content of 16.34%. Analysis of the 3,6-dinitrocarbazole produced by the method of Example I showed 16.4% nitrogen.

An infrared spectrum was obtained for the 3,6-dinitrocarbazole produced by the method of Example I, and showed a band at 2.8–2.9 mu, indicating the imino nitrogen group, strong bands at 6.5 mu and near 7.5 mu, indicating $NO_2$ groups, and the absorption bands generally found for substituted carbazoles. One particular feature distinguished the spectrum of 1,6-dinitrocarbazole from that of 3,6-dinitrocarbazole, e.g. the former has four bands in the 13–14 mu range while the latter has only two bands in this range.

Also, 3,6-dinitrocarbazole prepared by the method of Example I was converted to 3,6-dichlorocarbazole and compared with 3,6-dichlorocarbazole prepared by an established prior art method. These two 3,6-dichlorocarbazole samples were compared and found alike as follows.

A sample of the 3,6-dinitrocarbazole prepared by the method of Example I was converted to 3,6-dichlorocarbazole by reducing it with hydrogen and Raney nickel catalyst to the corresponding diamine, which was diazotized and treated with cuprous chloride to produce 3,6-dichlorocarbazole.

3,6-dichlorocarbazole was also prepared in the known manner from carbazole and sulfuryl chloride.

Both of the 3,6-dichlorocarbazole samples, prepared by the different methods, had a melting point of 202°–203° C., which is identical to the known melting point of 3,6-dichlorocarbazole, and addition of one sample of 3,6-dichlorocarbazole to the other failed to alter the melting point.

The present invention is not limited, other than as defined in the appended claims.

What is claimed is:

1. A method for separating, isolating and recovering 1,6-dinitrocarbazole and 3,6-dinitrocarbazole comprising the steps of dinitrating carbazole to form a crude mixture of dinitrocarbazoles comprising 1,6-dinitrocarbazole and 3,6-dinitrocarbazole and having a liquid and a solids portion; separating said liquid portion from said solids portion; adding an alcoholic solution of alkali to said solids portion to dissolve the 3,6-dinitrocarbazole as its salt while leaving the corresponding salt of 1,6-dinitrocarbazole as a solid; separating said salts; acidifying said separated salts to reform 1,6-dinitrocarbazole and 3,6-dinitrocarbazole; and recovering the separated 1,6-dinitrocarbazole and 3,6-dinitrocarbazole isomers.

2. The method according to claim 1, and further characterized in that said alcoholic solution of alkali is potassium hydroxide dissolved in ethanol.

3. The method according to claim 1 and further characterized in that said recovered isomers are washed with water.

4. A method for separating, isolating and recovering 1,6-dinitrocarbazole and 3,6-dinitrocarbazole comprising the steps of dinitrating carbazole to form a crude mixture of dinitrocarbazoles comprising 1,6-dinitrocarbazole and 3,6-dinitrocarbazole and having a liquid and a solids portion; separating said liquid portion from said solids portion; adding an alcoholic solution of alkali to said solids portion to dissolve the 3,6-dinitrocarbazole as its salt while leaving the corresponding salt of 1,6-dinitrocarbazole as a solid; separating said salts; acidifying said separated salts to reform 1,6-dinitrocarbazole and 3,6-dinitrocarbazole; recovering the separated 1,6-dinitrocarbazole and 3,6-dinitrocarbazole isomers; washing the separated isomers with warm water; dissolving the separated isomers in organic solvent; filtering the separate solutions of isomers; and recrystallizing and recovering the separate isomers.

5. A method for separating, isolating and recovering 1,6-dinitrocarbazole and 3,6-dinitrocarbazole comprising steps of dinitrating carbazole to form a crude mixture of dinitrocarbazoles comprising 1,6-dinitrocarbazole and 3,6-dinitrocarbazole and having a liquid and a solids portion; separating said liquid portion from said solids portion; adding a solution of potassium hydroxide in ethanol to said solids portion to dissolve the 3,6-dinitrocarbazole as its potassium salt while leaving the potassium salt of 1,6-dinitrocarbazole as a solid; separating said potassium salt solution from said solid salt; acidifying said separated salts with hydrochloric acid to reform 1,6-dinitrocarbazole and 3,6-dinitrocarbazole; recovering the separated 1,6-dinitrocarbazole and 3,6-dinitrocarbazole; washing the 1,6-dinitrocarbazole and the 3,6-dinitrocarbazole with water; filtering and recovering the 1,6-dinitrocarbazole and the 3,6-dinitrocarbazole; dissolving the 1,6-dinitrocarbazole and the 3,6-dinitrocarbazole separately in hot nitriobenzene; filtering said hot dissolved solutions separately; cooling said solutions to recrystallize the separated dinitrocarbazole isomers; recovering the separated dinitrocarbazole isomers from the nitrobenzene; and drying the 1,6-dinitrocarbazole and the 3,6-dinitrocarbazole.

No references cited.